(No Model.) 2 Sheets—Sheet 1.

W. H. FRITTS.
GRAIN BINDING MACHINE.

No. 324,464. Patented Aug. 18, 1885.

Attest
Sidney P. Hollingsworth
Harry Shipley

Inventor
W. H. Fritts
By his Attorney
Philip T. Dodge (No Model.) 2 Sheets—Sheet 2.
W. H. FRITTS.
GRAIN BINDING MACHINE.
No. 324,464. Patented Aug. 18, 1885.
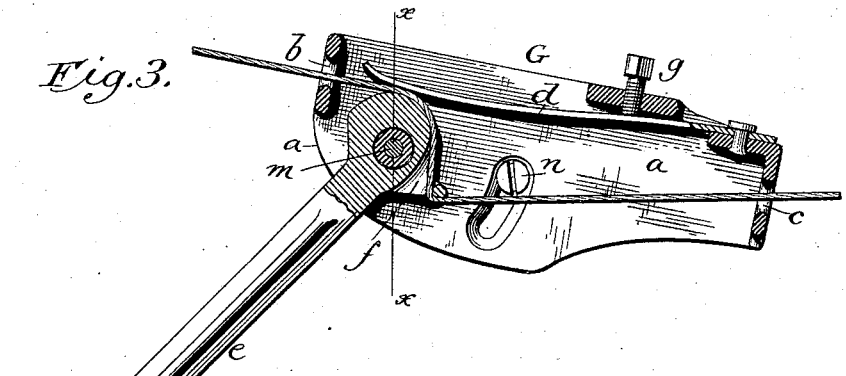
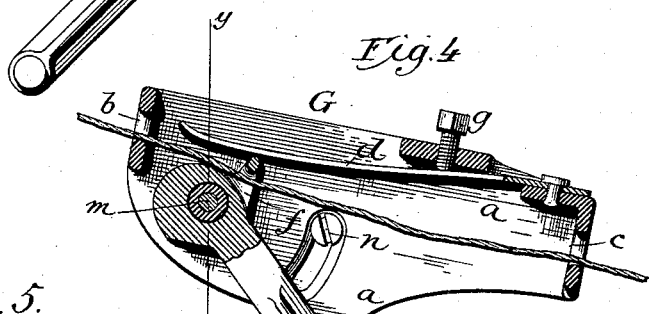
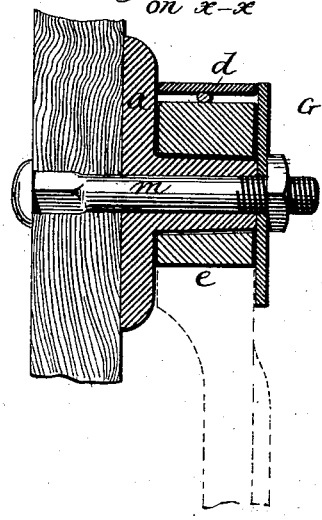
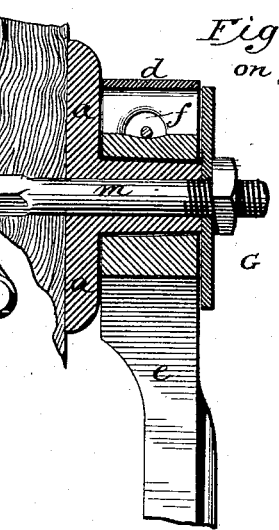
Attest. Inventor.
Sidney P. Hollingsworth W. H. Fritts.
Harry Shipley By his attorney
P. T. Dodge.

UNITED STATES PATENT OFFICE.

WILLIAM H. FRITTS, OF PLANO, ILLINOIS.

GRAIN-BINDING MACHINE.

SPECIFICATION forming part of Letters Patent No. 324,464, dated August 18, 1885.

Application filed August 4, 1883. (No model.)

*To all whom it may concern:*

Be it known that I, WILLIAM H. FRITTS, of Plano, in the county of Kendall and State of Illinois, have invented certain Improvements in Grain-Binding Machines, of which the following is a specification.

My invention relates to grain-binding machines of the ordinary type, wherein the cord or equivalent binding material, secured at one end, extends thence in its course to the ball, spool, or other source of supply through a binder-arm or needle, by which it is passed around the gavel and presented to the tying or fastening devices.

The aim of the invention is to provide an automatic device by which the cord shall be subjected to a strong tension immediately before and during the tying operation, and which may be so adjusted as to give the cord a free delivery or more or less tension during the accumulation of the gavel, as the character of the grain may render advisable. When the grain is sparse or overripe, the cord must be allowed to pass freely to and around the accumulating gavel that the grain-stalks may lie down readily and compactly in place; but when the grain is heavy and green the cord should receive more or less tension during the accumulation of the gavel.

To this end the invention consists in a tension device connected with and operated by the binding mechanism to alternately hold and release the cord at the times indicated; also, in a peculiar construction of the clamp; also, in a peculiar arrangement of the guides through which the cord passes in its course to the binder.

My improvements are applicable to binding-machines of different constructions; but in the accompanying drawings I have shown them operated in connection with what is commonly known in the art as an "Appleby binder," wherein the grain is delivered from the receiver over the main wheel to an inclined binding-table located on the outer side.

Figure 1:
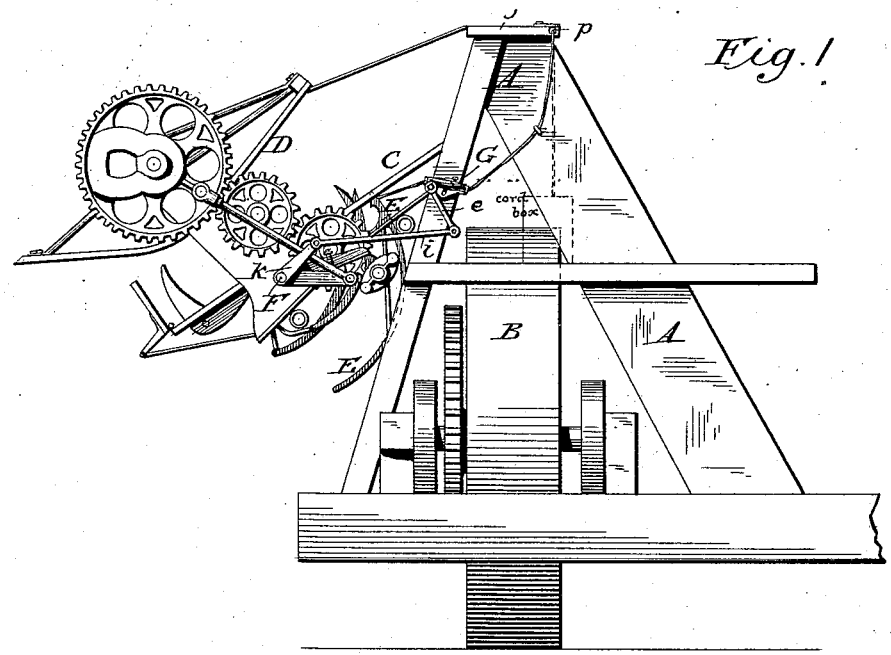
Figure 2:
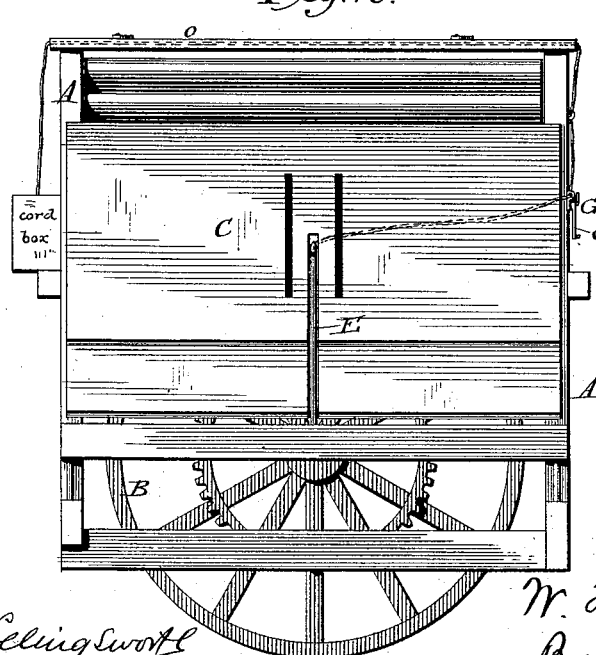

Referring to the accompanying drawings, Figure 1 represents a front end elevation in outline of a harvesting and binding machine provided with my improvements. Fig. 2 is an elevation of the harvester and binder-frame, looking from the stubble side of the machine, with my cord-guide applied thereto. Fig. 3 is a sectional elevation of the tension device, with the cord under tension. Fig. 4 is a similar view of the device adjusted to relieve the cord from tension. Figs. 5 and 6 are sectional views on the lines $x\ x$, Fig. 3, and $y\ y$, Fig. 4, respectively.

Referring to the drawings, A represents what is commonly known as the elevator or A-frame of a harvesting-machine, in which are located the elevating-belts or other appliances for delivering the loose grain over the main wheel B to the binding-table or platform C, located in an inclined position outside of the main wheel, as usual. The grain passes over the surface of the table beneath a fixed elevated breast-plate, D, above which the knot-tying and cord-holding devices are located. A vertically-vibrating binder-arm, E, is attached to a rock-shaft, F, extending horizontally beneath the binding-table, and moves upward at suitable intervals for the purpose of passing the cord around the gavel and presenting it to the tying devices.

All of the foregoing parts are constructed and arranged as in the ordinary Appleby machines, and constitute no part of the present invention.

For the purpose of applying the tension to the cord at the proper times, I make use of the tension device G, which may be located either upon the binder or upon the front or rear end of the elevator-frame in case the binder is attached immovably thereto. This tension device is constructed in the manner plainly represented in Figs. 3 to 6. A plate, $a$, is provided at its ends with eyes or guides $b$ and $c$, through which the cord is extended. A flat spring, $d$, is riveted at one end rigidly to the upper side of the eye $c$, or otherwise secured rigidly to the plate and extended forward toward the opposite end of the plate. To the face of the plate below the free end of the spring there is pivoted a vibratory lever, $e$, the upper end of which has a flat, or substantially flat, surface to bear beneath the free end of the spring $d$ and confine the cord against the same, the cord being passed through the eye $c$, thence between the end of the cam-lever and the spring $d$, and finally outward through the eye $b$. The end of the lever has its surface or periphery concentric, or substantially so, for a portion of its length, and has upon one side an eye, $f$, through which the cord passes.

Upon throwing the lever to the left, as represented in Figs. 3 and 5, the cord is flexed or bent in its passage around the end of the lever to aid in taking out kinks in the cord, and the spring permitted to press the cord tightly upon said lever, whereby it is subjected to a considerable degree of friction and thereby given the required tension. Upon moving the lever to the right, however, as shown in Fig. 4, its projecting eye $f$ acts beneath the spring and lifts the latter, as represented in Figs. 4 and 6, so that it ceases to press upon the cord. In this position of the parts the cord is released from friction and tension and permitted to pass freely through the devices.

A screw, $g$, seated in an ear upon the plate $a$, bears upon the upper side of the spring $d$, and serves as a means of imparting the required tension thereto, the result being to vary the pressure and friction upon the cord, so as to increase or diminish the tension, as may be demanded.

In applying the devices to the machine it may be located at any suitable point which will admit of the cord being passed conveniently through it, and the lever may be operated by a connection with any member of the machine, which moves at the proper times to give the desired action.

It is preferred, as shown in the drawings, to locate the device at one end of the binder, and to connect the lever through an intermediate link or rod, $i$, with a crank, $k$, applied to the shaft of the needle or binder-arm, as plainly represented in Fig. 1. When thus applied, it will be seen that the lever $c$ is moved always through the same arc, and that if the position of the device remain unchanged the tension will be applied and relieved at definite points or periods in the binding operation. In order that the time of changing the tension may be varied, as circumstances may require, I connect the plate $a$ to the machine by a pivot, $m$, passing centrally through the lever, and provide the plate with a grooved slot and a fastening-screw, $n$, extending through the same into the frame. Its construction and mode of arrangement admit of the plate being swung vertically around the pivot $m$, so as to vary the position of the tension-spring with reference to the end of the lever. This change in the position of the spring will cause the eye $f$ of the lever to encounter the spring sooner or later in the course of its movement.

While the construction represented is preferred as being the most simple known to me at the present time for adjusting the plate, it is manifest that any other suitable construction to the same end may be adopted, the essence of my invention in this regard consisting in rendering the spring adjustable around the end of a tension-lever which moves through a definite arc.

In practice the cord-box or other source of supply may be in front or rear of the machine; but with a front-gear binder, with the box in rear, it is necessary to pass the cord thence over the top of the elevator-frame A to the opposite end of the machine. For the purpose of guiding the cord in its passage across the machine and permitting the operator to view the same at all times, I provide the top board or timber, $o$, which extends across the top of the elevator-frame, as usual, with a longitudinal groove, $p$, adapted to receive the cord, as shown. To prevent the escape of the cord I provide two or more buttons or equivalent retaining devices attached to the grooved guide and extending across the groove, as shown.

In operating the machine the parts may be adjusted to apply a full tension to the cord at about the time the needle passes through the breast-plate, or, in other words, at a time just before the cord is presented by the needle to the tying devices. The tension thus applied is continued during the operation of tying and severing the band and until the binder-arm leaves the tying devices in its backward motion, whereupon it may be entirely relieved, if desired, from tension and permitted to pass freely from the ball or spool to the grain until after the next gavel has been completed and the cord passed around the same nearly to the tying devices.

A suitable adjustment of the parts will produce a greater or less tension, as demanded.

The present invention is restricted to those matters and things which are hereinafter claimed; and as to all matters which may be described or shown, but which are not claimed, the right is reserved to make the same the subject of a separate application.

Having thus described my invention, what I claim is—

1. The improved tension device for a grain-binder, consisting of a tension-spring, and a tension-lever provided with the cord-confining surface and a projection to act upon the spring, substantially as described, whereby the lever is caused in one position to confine the cord against the spring and when in another position to lift the spring from the cord.

2. In combination with the plate having the two eyes or guides at opposite ends, the flat tension-spring, and the pivoted lever provided with a bearing-surface to act upon the cord, and with the eye $f$, adapted to serve the twofold purpose of guiding the cord and of lifting the spring therefrom.

3. In a tension device, the combination of the tension-lever having the eccentric end, devices, substantially as shown, to vibrate said lever through a fixed arc, and the tension-spring adjustable circumferentially around the end of the lever, as described, whereby the lever may be caused to apply the tension at an earlier or a later period in the course of its movement.

4. The supporting-plate, in combination with the lever having the eccentric end to act on the cord, the spring having one end fixed and the opposite end arranged to press the cord against the lever, and the screw $g$, for adjusting the tension of the spring, as descibed and shown.

5. In combination with the tension-lever, the adjustable plate provided with cord-guides, means, substantially as described, for securing said plate in position, and the tension-spring secured to the plate and co-operating with the lever, as described.

6. In a grain binding and harvesting machine, the open grooved cord-guide extending across the top of the elevator, substantially as described.

7. In the combined harvester and binder, the grooved board or guide extending across the top of the elevator-frame, in combination with means, substantially as described, for securing the cord therein.

WILLIAM H. FRITTS.

Witnesses:
JONATHAN AGLER,
I. E. BENNETT.